United States Patent
Bozkurt

(10) Patent No.: US 9,623,494 B2
(45) Date of Patent: Apr. 18, 2017

(54) MACHINING TOOL

(71) Applicant: GUEHRING OHG, Albstadt (DE)

(72) Inventor: Lutfi Bozkurt, Winterlingen (DE)

(73) Assignee: Guehring OHG, Albstadt (DE)

( * ) Notice: Subject to any disclaimer, the term of this patent is extended or adjusted under 35 U.S.C. 154(b) by 0 days.

(21) Appl. No.: 13/759,583

(22) Filed: Feb. 5, 2013

(65) Prior Publication Data

US 2013/0216318 A1    Aug. 22, 2013

Related U.S. Application Data

(63) Continuation of application No. PCT/DE2011/001556, filed on Aug. 5, 2011.

(30) Foreign Application Priority Data

Aug. 5, 2010    (DE) .................. 10 2010 036 869

(51) Int. Cl.
| | |
|---|---|
| B23C 5/00 | (2006.01) |
| B23C 5/16 | (2006.01) |
| B23B 31/00 | (2006.01) |
| B23B 51/02 | (2006.01) |
| B23C 5/10 | (2006.01) |
| B23D 77/02 | (2006.01) |
| B23C 5/28 | (2006.01) |

(52) U.S. Cl.
CPC .............. *B23C 5/16* (2013.01); *B23B 31/005* (2013.01); *B23B 51/02* (2013.01); *B23C 5/10* (2013.01); *B23C 5/28* (2013.01); *B23D 77/02* (2013.01); *B23B 2226/275* (2013.01); *B23B 2226/61* (2013.01); *B23C 2226/27* (2013.01); *B23C 2226/61* (2013.01); *B23G 2225/40* (2013.01); *Y10T 407/14* (2015.01); *Y10T 407/27* (2015.01)

(58) Field of Classification Search
CPC ...... B23B 29/022; B29C 70/028; B29C 70/46
USPC .................................... 408/144, 145
See application file for complete search history.

(56) References Cited

U.S. PATENT DOCUMENTS

| | | | | |
|---|---|---|---|---|
| 5,137,098 | A * | 8/1992 | Raffaelli | 175/403 |
| 5,865,571 | A | 2/1999 | Tankala et al. | |
| 6,595,727 | B2 * | 7/2003 | Arvidsson | 407/35 |
| 6,913,428 | B2 * | 7/2005 | Kress et al. | 408/144 |
| 2003/0133763 | A1 | 7/2003 | Kuroda et al. | |

FOREIGN PATENT DOCUMENTS

| | | |
|---|---|---|
| DE | 26 48 753 | 5/1978 |
| DE | 199 34 125 | 1/2001 |
| DE | 203 15 796 | 2/2004 |
| DE | 103 59 854 | 7/2005 |
| DE | 10 2006 016 290 | 10/2007 |
| EP | 2377634 A1 * | 10/2011 |

(Continued)

OTHER PUBLICATIONS

International Search Report and Written Opinion of the International Searching Authority (with English Translation) dated May 2, 2012, 20 pages.

*Primary Examiner* — Will Fridie, Jr.
(74) *Attorney, Agent, or Firm* — Burr & Brown, PLLC

(57) ABSTRACT

A machining tool that comprises a cutting part and a base that supports the cutting part. The base and/or the cutting part are made at least in part of a fiber-reinforced plastic. In some embodiments, the fiber-reinforced plastic is CFRP or CFC.

15 Claims, 2 Drawing Sheets

(56) References Cited

FOREIGN PATENT DOCUMENTS

| JP | 05337770 A | * | 12/1993 | ............... B23Q 3/12 |
| JP | 2005199391 A | * | 7/2005 | ............. B23B 29/02 |
| WO | 98/57771 | | 12/1998 | |

* cited by examiner

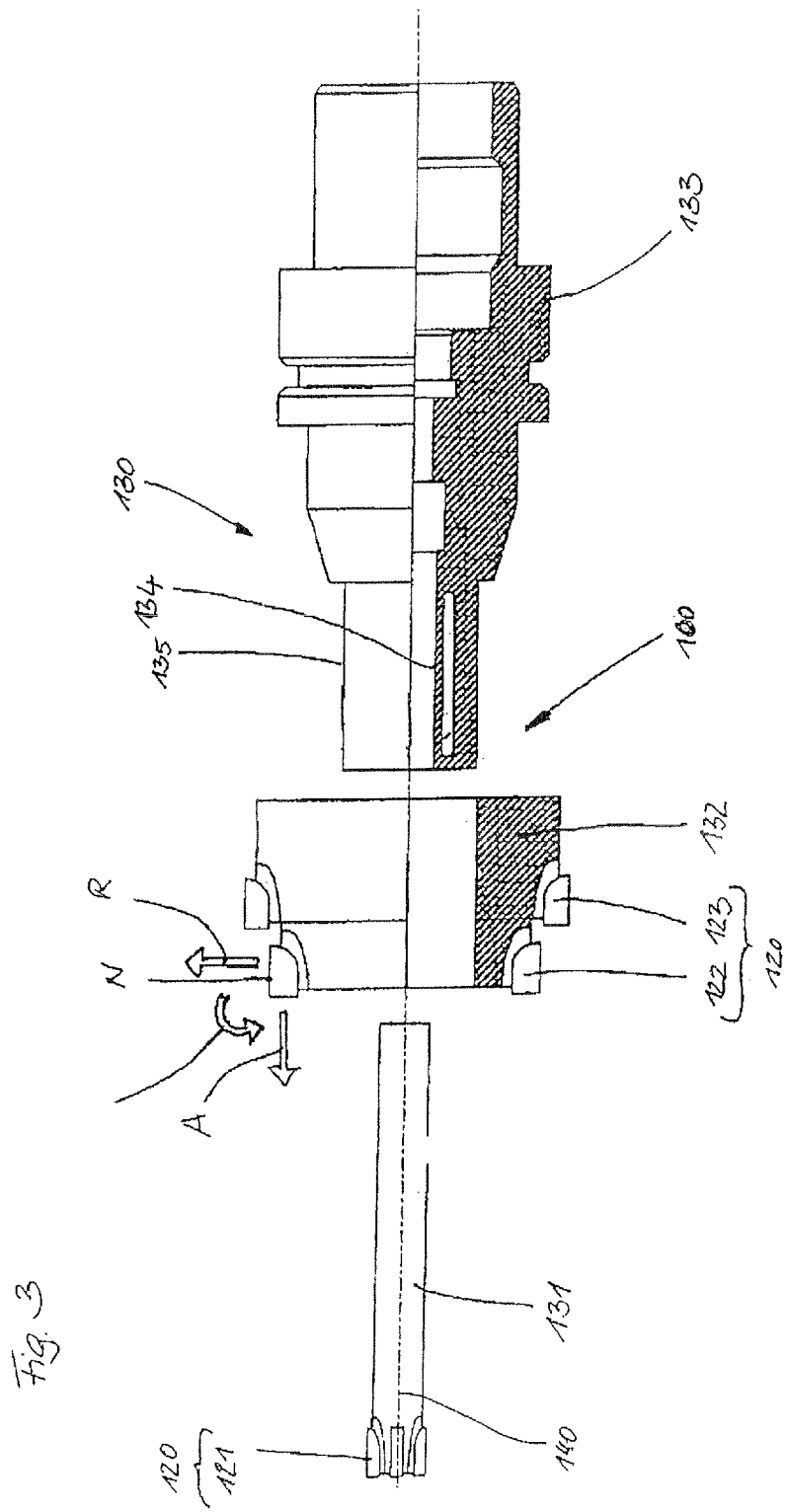

MACHINING TOOL

The invention relates to a machining tool with a cutting part and a base body that supports the cutting part.

The invention is based on conventional stationary or rotary driven machining tools, e.g., drilling, milling or turning tools. Such tools have a generally known structural design and function, and were previously fabricated as a single piece or multiple pieces out of a metal, ceramic or ceramic composite. Of course, these types of tools exhibit a relatively high mass, and are relatively stiff. Therefore, when machining a tool, vibrations that carry over from the cutting part to the tool base body are routinely encountered. These vibrations generate vibration noises, and can negatively affect the surface quality of the machined tool surface.

Therefore, the object of the invention is to develop a machining tool distinguished by a lower weight and good vibration characteristics.

This object is achieved with a tool according to claim 1. Advantageous or preferred further developments are the subject of dependent claims.

A machining tool according to the invention has a cutting part and a base body that supports the cutting part. The cutting part and base body can be connected with each other as a single piece, meaning that the machining tool can consist of a single piece comprised of a cutting part and base body that were initially separately fabricated, or as an alternative be made out of a single piece using a solid material. However, the cutting part and base body can also be detachably joined together, i.e., the machining tool can exhibit a modular design. Both the cutting body and base body can each be designed as a single piece. However, the cutting part can also exhibit a plurality of cutting bodies, e.g., cutting plates or cutting bars, which are arranged on a holding body joined with the base body, e.g., on a cartridge that holds the cutting plate. The base body, which holds the cutting part or aforementioned holding body, and is clamped via the machining tool into a tool holder, for example, can also be designed as a single piece or multiple pieces.

A machining tool according to the invention is characterized in that it is made at least partially out of a fiber-reinforced plastic. In this conjunction, what this means at least in part is that it is fabricated as a single piece out of a body comprised of fiber-reinforced plastic, e.g., an extruded (pultruded) round bar, or that one or more selected functional sections are made out of fiber-reinforced plastic. Such functional sections are sections whose function is to transmit forces and/or torques that arise while cutting between the cutting part and base body. As a consequence, such functional sections can be the base body and/or cutting part. Apart from that, however, these functional sections also encompass functionally or structurally definable constituents of the base body and/or cutting part, for example a shank section on the side of the base body, or the aforementioned holder body, e.g., cartridge, or the aforementioned cutting body on the side of the cutting part.

Using a fiber-reinforced plastic, for which in particular CFK (carbon fiber-reinforced plastic) or CFC (carbon fiber-reinforced carbon) are suitable, enables the manufacture of a cutting tool characterized by a lower weight in comparison to conventional cutting tools based on metal or ceramic. At the same time, using a fiber-reinforced plastic that takes into account special requirements placed on the respective functional section and a corresponding processing, in particular with respect to fiber density and fiber orientation, makes it possible to achieve the required characteristics with regard to stiffness, impact strength and vibration and noise damping. Preferred fiber-reinforced plastics at least for a cutting tool composed of a single piece include extruded CFK round bars with short fibers embedded into a plastic matrix, which are essentially unidirectionally aligned in the longitudinal direction of the cutting tool. In addition to the aforementioned characteristics, such fiber-reinforced plastics are easier to process than the conventionally used materials based on metal or ceramic.

The machining tool according to the invention (given a single-piece design) or at least one functional section (given a multiple-piece design) can be fabricated based on a tool blank made out of a fiber-reinforced plastic. In a single-piece machining tool, for example, the primary and/or secondary cutter geometry required for machining is introduced, e.g., milled, into the tool blank in the area of the cutting part, complete with mating surfaces for the base surface and the jacket surface arrangement of the cutting insert, while the tool blank is machined for accommodation and clamping in a tool holder in the area of the base body. In a multiple-part cutting tool, the tool blank is only correspondingly machined in terms of the functions intended for the respective functional section.

The tool blank can be a cylindrically wound laminate, i.e., the tool blank can be comprised of several woven fabrics embedded into a synthetic resin matrix, for example which are wound around a core of solid resin material or a hollow core. However, the tool blank can also be an injection molded, transfer molded or pultruded part. Tool blanks manufactured according to one of the aforementioned methods, in particular through pultruding, are characterized by short fibers embedded in a matrix consisting of synthetic resin, and therefore offer the advantage relative to laminates, which most often only contain long fibers, of being able to precisely generate clearly delineated surfaces, for example a driving area, and defined edges, for example primary and secondary cutting edges, even given small diameters.

In a preferred embodiment, the machining tool according to the invention is fabricated out of a single piece. It was recognized that a machining tool made as a single piece out of a fiber-reinforced plastic is perfectly adequate for the machining requirements placed on selected areas of application. e.g., wood and plastic machining, but also the machining of easily cut light metal materials. Of course, the fiber-reinforced plastic material used for tool manufacture is correspondingly selected based on the respectively expected requirements, e.g., with respect to strength and stiffness. For this reason, CFK and CFC materials are preferably used for the cutting tools fabricated as a single piece.

The cutting part can encompass one or more cutting bodies. Therefore, the cutting part can be designed as a single piece or encompass several cutting bodies, e.g., in the form of cutting plates or cutting bars. In each instance, different materials with varying characteristics in terms of hardness, vibration damping, weight, temperature resistance, etc. can be expediently and advantageously combined with each other in this structural design. For example, the cutting part or cutting bodies can be made out of a steel material, carbide or a ceramic composite. The cutting bodies can be arranged on the base body or a holding body joined with the base body, for example adhesively bonded. For example, the holding body can be a cartridge, on which a cutting body, e.g., a cutting plate, is attached, for example in an adjustable manner. The base body and/or holding body can be made out of a fiber-reinforced plastic. The cutting bodies can be easily and reliably adhesively bonded to a material comprised of fiber-reinforced plastic. Alternatively, the cutting bodies can also be screwed to the base body or holding body, or held in place on them by clamping claws.

Using a fiber-reinforced plastic for at least one of the functional sections of a cutting tool permits the provision of an internal coolant and/or lubricant supply channel system. In particular, having this coolant and/or lubricant supply channel system pass through the functional section consisting of the fiber-reinforced plastic enormously simplifies the formation by comparison to conventional steel or ceramic materials.

The invention will be explained below based on two embodiments.

FIG. 3 shows a third embodiment of a machining tool according to the invention.

Figure 1:
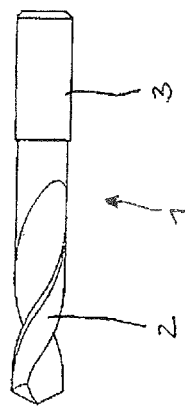
FIG. 1 shows a first embodiment of a machining tool according to the invention.

The first embodiment shown on FIG. 1 is a machining tool in the form of a drill 1. The drill 1 has a cutting part 2 and a base body 3 holding the cutting part 2. The base body 3 and the cutting part 2 are designed as functional sections on a pultruded round bar made out of a carbon fiber-reinforced plastic (CFK), in which short fibers are embedded in a synthetic resin matrix. Therefore, the drill 1 is designed as a single piece. The base body 3 defines a cylindrical shank section for clamping in a tool holder (not depicted). Primary and secondary cutting edges are ground into the cutting part 2 in the known manner.

Figure 2:
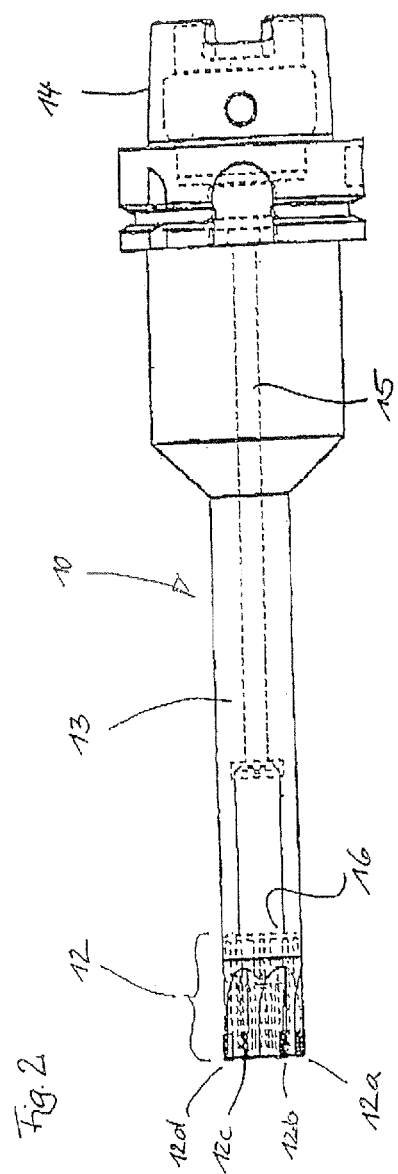
FIG. 2 shows a second embodiment of a machining tool according to the invention.

The second embodiment shown on FIG. 2 relates to a machining tool in the form of a drilling tool 10 comprised of multiple parts. The drilling tool 10 exhibits a cutting part 12 and a base body 13 holding the cutting part 12. The side of the base body 13 facing away from the cutting part 12 has an HSK (hollow shank taper) section 14 for coupling the drilling tool 10 to a machine tool (not shown). The cutting part 12 is here comprised of a plurality of plate-shaped cutting bodies 12a, 12b, 12c, 12d arranged in the circumferential direction around the end of the base body 13 facing away from the HSK section 14.

As opposed to the drill 1 according to the first embodiment, the drilling tool 10 according to the second embodiment has a base body 13 composed of a carbon fiber-reinforced plastic (CFK). As in the first embodiment, the base body 13 is fabricated by machining a pultruded round bar.

The cutting plates 12a, 12b, 12c, 12d are fabricated out of a known material, e.g., carbide, polycrystalline diamond (PCD), cubic boron nitride (CBN) or the like, and adhesively bonded into pocket-like recesses formed on the base body 13.

The machining tool depicted on FIG. 2 also exhibits an internal coolant and lubricant supply channel system in the base body 13, which consists of a central channel 15 that leads to the cutting plates 12a, 12b, 12c, 12d via branch channels 16.

FIG. 3 presents an exploded view of a machining tool according to the invention in the form of a multipoint reamer 100 comprised of multiple parts. The multipoint reamer 100 is described and shown in DE 102006016290 A1 (see FIG. 1), so that reference is made to the information contained in DE 102006016290 A1 with regard to structural design and function. The multipoint reamer 100 depicted on FIG. 3 has a base body 130, which exhibits a first holding body 131, a second holding body 132 and an HSK section 133 for coupling the drilling tool 10 to a machine tool (not shown). The first holding body 131 and second holding body 132 are joined with the HSK section 133 coaxially to each other relative to the tool axis 140. For this purpose, the first holding body 131 is in particular non-positively accommodated in an interior bore 134 of the HSK section 133, while the second holding body 132 sits non-positively on a cylindrical section 135 of the HSK section 133.

The first holding body 131 and the second holding body 132 are each fitted with several PCD, CBN or carbide cutters, which are secured to the respective holding body, either immovably or variably by means of a fine adjustment device. The plate-shaped cutting bodies marked 121 that comprise the cutting part are directly attached (adhesively bonded or tightly screwed) to the first holding body. The plate-shaped cutting bodies marked 122 and 123 that comprise cutting parts can be fastened (adhesively bonded or tightly screwed) to cartridges not depicted in any more detail, which are adjustably fixed in correspondingly designed pocket-shaped recesses in the holding body 132. The adjustability is here designed in such a way as to allow three degrees of freedom marked with arrows R, A and N on FIG. 3.

Similarly to the drilling tool 10 according to the second embodiment, the multipoint reamer 100 according to the third embodiment has a base body 130 13 composed of a carbon fiber-reinforced plastic (CFK). In particular, the first holding body 131, second holding body 132 and HSK section 133 are fabricated by machining a pultruded round bar. In like manner, the cartridges holding the plate-shaped cutting bodies and arranged on the second cutter holder 132 are fabricated out of a carbon fiber-reinforced plastic (CFK).

In the machining tools according to the second and third embodiments described above, all functional sections of the base body and cutting part other than the cutting body are made out of a fiber-reinforced plastic (CFK). However, this is not absolutely necessary. It is conceivable for only selected functional sections, e.g., only the cartridges holding the cutting bodies, the first holding body 131 and/or the second holding body 132, to be fabricated out of a fiber-reinforced plastic (CFK) in the multipoint reamer according to the third embodiment, while the HSK section is composed of the usual metal materials.

The invention claimed is:

1. A machining tool, comprising:
   a cutting part, a base body and plural cutting bodies,
   the base body made of fiber-reinforced material,
   the base body rotatable about a base body axis,
   the base body having a base body first end and a base body second end,
   the cutting part made of a fiber-reinforced material,
   the cutting part rotatable about a cutting part axis,
   the cutting part having a cutting part first end and a cutting part second end,
   the cutting part first end directly attached to the base body second end,
   the cutting part axis extending along the same line as the base body axis,
   the cutting bodies directly attached to the cutting part second end.

2. The machining tool according to claim 1, wherein the machining tool is a single-piece structure.

3. The machining tool according to claim 1, wherein the machining tool comprises multiple pieces.

4. The machining tool according to claim 1, wherein each cutting body comprises at least one of a steel material, a carbide material and a ceramic composite material.

5. The machining tool according to claim 1, wherein the cutting part first end is attached to the base body second end by at least one from the group consisting of a non-positive connection and a positive connection.

6. The machining tool according to claim 1, wherein the machining tool comprises an internal coolant and/or lubricant supply channel system.

7. The machining tool according to claim 1, wherein the cutting part comprises at least one material selected from among carbon fiber-reinforced plastic and carbon fiber-reinforced carbon.

8. The machining tool according to claim 1, wherein each cutting body comprises PCD or CBN.

9. A machining tool comprising:
a cutting part and a base body,
the base body rotatable about a base body axis,
the base body having a base body first end and a base body second end,
the cutting part made of a fiber-reinforced material,
the cutting part rotatable about a cutting part axis,
the cutting part having a cutting part first end and a cutting part second end,
the cutting part first end directly attached to the base body second end,
the cutting part axis extending along the same line as the base body axis,
the cutting part comprising plural cutting bodies.

10. The machining tool according to claim 9, wherein the cutting part is non-positively joined with the base body.

11. The machining tool according to claim 9, wherein the cutting part is positively joined with the base body.

12. The machining tool according to claim 1, wherein at least a portion of each cutting body is spaced farther from an axis of the machining tool than any portion of the cutting part is spaced from said axis.

13. The machining tool according to claim 9, wherein the machining tool is a single-piece structure.

14. The machining tool according to claim 9, wherein the cutting part comprises at least one material selected from among carbon-fiber reinforced plastic and carbon-fiber reinforced carbon.

15. The machining tool according to claim 9, wherein the base body comprises a fiber-reinforced material.

* * * * *